United States Patent
Spillman et al.

(12)

(10) Patent No.: US 6,410,181 B1
(45) Date of Patent: Jun. 25, 2002

(54) HIGH TEMPERATURE LITHIUM OXYHALIDE ELECTROCHEMICAL CELL

(75) Inventors: David M. Spillman, Tonawanda; Esther S. Takeuchi, East Amherst, both of NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 0 days.

(21) Appl. No.: 09/562,532

(22) Filed: May 2, 2000

Related U.S. Application Data

(60) Provisional application No. 60/132,549, filed on May 5, 1999.

(51) Int. Cl.[7] .............................. H01M 4/36; H01M 4/74
(52) U.S. Cl. ............................. 429/101; 429/242; 29/2
(58) Field of Search .................................. 429/101–105, 429/242; 29/2

(56) References Cited

U.S. PATENT DOCUMENTS

| | | | |
|---|---|---|---|
| 2,909,586 A | 10/1959 | Hagspihl | |
| 4,263,378 A | * 4/1981 | Feiman et al. | |
| 4,335,191 A | * 6/1982 | Peled | |
| 4,756,984 A | 7/1988 | Descroix et al. | 429/116 |
| 5,091,275 A | 2/1992 | Brecht et al. | 429/247 |
| 5,401,278 A | 3/1995 | Yasuds et al. | 29/2 |
| 5,468,572 A | 11/1995 | Zguris et al. | 429/247 |
| 5,554,463 A | * 9/1996 | Marincic et al. | |
| 5,705,293 A | 1/1998 | Hobson | 429/162 |
| 6,190,803 B1 | * 2/2001 | Tomiyama et al. | |

FOREIGN PATENT DOCUMENTS

| | | |
|---|---|---|
| EP | 0191569 | 1/1986 |
| EP | 0239343 | 3/1987 |
| EP | 0834936 | 3/1996 |
| GB | 2056752 | 4/1980 |

OTHER PUBLICATIONS

BGF Industries Fabric Reference Glass Composition Data Sheet, 1997., No Month.*

Data Sheet for Fiberglass Compositions and their Comparative Properties from the Handbook of Reinforcement for Plastics, Katz and Milewski, 1987., No Month.*

* cited by examiner

*Primary Examiner*—Patrick Ryan
*Assistant Examiner*—Susy Tsang-Foster
(74) *Attorney, Agent, or Firm*—Hodgson Russ LLP

(57) ABSTRACT

An alkali metal electrochemical cell, and particularly a lithium oxyhalide cell, is described. The oxyhalide cell also exhibits superior restart characteristics by the provision of a MANNIGLASS 1200 separator.

27 Claims, No Drawings

HIGH TEMPERATURE LITHIUM OXYHALIDE ELECTROCHEMICAL CELL

CROSS REFERENCE TO RELATED APPLICATION

The present application claims priority based on provisional application Serial No. 60/132,549, filed May 5, 1999.

BACKGROUND OF THE INVENTION

1. Field of the Invention

The present invention generally relates to the conversion of chemical energy to electrical energy and, in particular, to an alkali metal oxyhalide electrochemical cell capable of discharge at temperatures up to about 200° C.

2. Prior Art

It is known that the useful operating temperature range of a lithium electrochemical cell, such as a lithium oxyhalide cell, can be extended beyond 180.54° C. the melting point of lithium, and up to approximately 200° C. Although functional, conventional lithium cells manufactured for such high temperature applications exhibit serious deficiencies. In particular, it has been discovered that certain materials used in the construction of prior art lithium cells severely limit or totally inhibit the restart capability of the cell beyond a certain state of discharge. This requires that the cell be removed from the device being powered prior to the device being restarted with another cell.

According to the present invention, it has been discovered that the restart characteristics of a primary lithium oxyhalide cell or battery, which is intended for use in elevated temperature applications, can be significantly improved through the use of certain components and materials of construction.

SUMMARY OF THE INVENTION

One embodiment of the present invention describes a high capacity anode current collector which is thermally stable in a lithium oxyhalide cell and to which the electrochemically active anode material has superior bonding strength in comparison to prior art metallic current collectors. It is well known that lithium metal softens and melts at a temperature of approximately 180.54° C. If the lithium melts, an internal short circuit usually develops. This can result in cell venting or in a violent explosion.

As a solution, certain anode alloys have been developed to extend the thermal stability of lithium cells beyond 180.54° C. These include a lithium-aluminum alloy in which the weight percent of lithium varies between approximately 50% and 99.9%, a lithium-magnesium alloy in which the weight percent of lithium varies between approximately 67% and 99.9%, a ternary lithium-aluminum-magnesium alloy in which the weight percent of lithium varies between approximately 50% and 99.5% and a lithium-boron alloy in which the weight percent of lithium varies between approximately 40% and 99.5%. Other anode alloys are also known, but these are the most common.

In particular, it is known that a lithium-magnesium alloy can be used to extend the temperature tolerance of a lithium anode well above 180° C. Differential scanning calorimetry measurements indicate that this particular alloy softens and melts over a temperature range of 180° C.to well over 230° C. depending on the amount of magnesium present.

It has also been discovered that as the magnesium content in the anode material is increased, the alloy stiffens and becomes less pliable. This has important implications for the design of the current collector. Traditionally, the anode current collector in a lithium oxyhalide cell is made from nickel, stainless steel or nickel-plated stainless steel. To provide superior adhesion while maximizing the cell's energy density, these current collector materials are often provided in an annealed, expanded form. When the lithium content in an alloy is higher than 95%, by weight, such materials can still be used. As the lithium content is decreased, however, the anode material stiffens and adhesion to the current collector becomes problematic. When the magnesium content in the lithium anode is increased to approximately 15%, by weight, or higher, the anode is prone to delamination from the current collector as the electrode is bent, rolled or deformed. This is undesirable since intimate contact between the anode material and the current collector is lost, resulting in increased cell polarization. Additionally, delamination is known to lead to safety problems such as cell venting or explosion if the lithium oxyhalide cell is discharged to end-of-life.

According to another embodiment of the present invention, an expanded metal screen is both pulled and annealed to provide a new current collector for a lithium cell, preferably a lithium oxyhalide cell. When the magnesium content of the lithium alloy is at least 15%, by weight, and preferably between about 23% to about 27%, bonding between the anode alloy and the current collector is increased over that known by the prior art. Furthermore, the thusly fabricated anode assembly can be repeatedly bent, rolled or deformed with no visible delamination of the alloy from the current collector. Such an anode assembly provides for reduced polarization, increased energy density and increased safety when used in a lithium oxyhalide cell of the present invention. Thus, the first object of the present invention is the provision of a high capacity anode current collector which is thermally stable and to which an electrochemically active lithium alloy having a magnesium content of about 23% to about 27%, by weight, is contacted. This anode alloy has superior bonding strength to the current collector in comparison to prior art constructions.

A further embodiment of the present invention relates to a high temperature, primary lithium oxyhalide cell in which the cell's energy density is increased and the restart capability of the cell is greatly improved in comparison to that offered by the prior art. This is accomplished through the use of a novel separator, electrolyte and electrolyte salt combination.

As discussed earlier, prior art lithium cells are known to have serious restart deficiencies after having been discharged to a particular state. Traditionally, problems concerning restarting primary lithium cells have been identified as anode, cathode or electrolyte related phenomenon. However, according to the present invention, in lithium oxyhalide cells and, in particular, those containing a lithium-magnesium anode, the restart phenomenon is attributed solely to the type of separator used. Additionally, the cell's energy density is increased through the use of a particular combination of separator and electrolyte.

In that light, it has also been discovered that the use of a MANNIGLASS 1200 separator in combination with a thionyl chloride depolarizer and a lithium tetrachloroaluminate salt provides a lithium oxyhalide cell with increased energy density in comparison to the use of lithium electrolyte salts such as lithium tetrachlorogallate. Thus, another embodiment of the present invention relates to a high temperature lithium oxyhalide cell having increased energy density and improved restart capability in comparison to that offered by the prior art.

DETAILED DESCRIPTION OF THE PREFERRED EMBODIMENTS

The oxyhalide cell of the present invention includes an anode electrode, preferably an alkali metal, and most preferably a lithium-alloy anode electrode. According to the present invention, it has been discovered that a lithium-magnesium anode alloy containing 23% to 27%, by weight, magnesium offers the thermal stability required for operation of a primary lithium oxyhalide cell at temperatures up to about 200° C. while maximizing the cell's energy density. If the magnesium content is lower than approximately 23%, the resulting anode material lacks the thermal stability required for high rate discharge at 200° C. If the magnesium content is higher than 27%, the energy density of the cell is degraded due to the reduced lithium content.

The anode electrode further comprises a unitary, conductive member which serves as the current collector and is fabricated from a thin sheet of metal, preferably nickel. The anode current collector is preferably in an annealed, expanded screen. Annealing is performed by heating the screen in a reducing atmosphere of 1,130° F. minimum for at least two hours. Before annealing, the current collector is pulled from both the length-wise direction and the side-wise direction. The annealed and expanded form of the anode current collector facilitates adherence to the lithium anode active material.

The active material of the cathode electrode is of a carbonaceous material contacted to a cathode current collector. The carbonaceous material preferably comprises acetylene black and/or carbon black. Other suitable materials include graphitic and nongraphitic forms of carbon, such as coke, charcoal or activated carbon. If required, a binder material can also be used. Preferred binders comprise fluro-resins in powdered form such as powdered polytetrafluoroethylene (PTFE).

The cathode current collector is preferably a screen selected from the group consisting of cobalt-nickel alloys, chromium ferritic alloys, nickel, aluminum, stainless steel, mild steel and titanium. A preferred material for the cathode current collector 14 is a type 200 or 201 series nickel screen per ASTM B-162 specifications. Prior to use, the screen must be clean, bright and free of all grease and processing oils. The screen is preferably annealed in a reducing atmosphere of 1,130° F. minimum for at least two hours.

An oxyhalide cell of the present invention further comprises a nonaqueous, tonically conductive catholyte as a depolarizer operatively associated with the anode and the cathode. The catholyte serves as a medium for migration of ions between the anode and cathode during the cell electrochemical reactions and nonaqueous solvent depolarizers are chosen so as to exhibit those physical properties necessary for ionic transport (low viscosity, low surface tension and wettability). Suitable nonaqueous depolarizers are comprised of an inorganic salt dissolved in a nonaqueous codepolarizer system. More preferably, the nonaqueous depolarizer comprises an alkali metal salt dissolved in a catholyte solution comprising a halogen and/or interhalogen dissolved in a nonaqueous solvent, the halogen and/or interhalogen serving as a soluble depolarizer in the high energy density cell of the present invention. The halogen and/or interhalogen also can serve as a cosolvent in the electrochemical cell. The halogen is selected from the group of iodine, bromine, chlorine or fluorine while the interhalogen is selected from the group of ClF, $ClF_3$, IC, $IC_3$, IBr, $IF_3$, $IF_5$, BrCl, BrF, $BrF_3$, or $BrF_5$ and mixtures thereof.

The nonaqueous solvent depolarizer may be one of the organic solvents which is substantially inert to the anode and cathode materials such as tetrahydrofuran, propylene carbonate, acetonitrile, dimethyl sulfoxide, dimethyl formamicle, dimethyl acetamide and others. The nonaqueous solvent depolarizer also may be one or a mixture of more than one of the inorganic solvents which can serve as both a solvent and a depolarizer such as thionyl chloride, sulfuryl chloride, selenium oxychloride, chromyl chloride, phosphoryl chloride, phosphorous sulfur trichloride and others.

The ionic conductivity of the nonaqueous catholyte solution is preferably facilitated by dissolving a metal salt in the nonaqueous depolarizer. Examples of metal salts are lithium halides such as LiCl and LiBr and lithium salts of the $LiMX_n$ type, such as $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, LiSCN, $LiO_3SCF_2CF_3$, $LiC_6F_5SO_3$, $LiO_2$, $LiO_2CCF_3$, $LiSO_3F$, $LiB(C_6H_5)_4$ and $LiCF_3SO_3$, and mixtures thereof. Suitable salt concentrations typically range between about 0.1 to 1.8 molar.

Thus, the solution of halogen and/or interhalogens, the nonaqueous solvent depolarizer and, optionally, the ionic salt, serve as the codepolarizer and catholyte of the cell.

The electrochemical cell of the present invention operates in the following manner. When the ionically conductive catholyte solution becomes operatively associated with the anode and the cathode of the cell, an electrical potential difference is developed between terminals operatively connected to them. The electrochemical reaction at the anode includes oxidation to form metal ions during discharge of the cell. The electrochemical reaction at the cathode involves conversion of ions which migrate from the anode to the cathode into atomic or molecular forms. In addition, the halogen and/or interhalogen of the catholyte is believed to undergo a reaction or reactions with the nonaqueous solvent thereof resulting in the formation of a compound or complex which exhibits the observed open circuit voltage of the cell. Increasing the concentration of halogen and/or interhalogen in the catholyte increases the cell's open circuit voltage, especially in the initial stages of discharge.

According to the present invention, a MANNIGLASS 1200 separator, manufactured by Lydall Manning of Troy, N.Y. is used in the lithium oxyhalide cell. The use of MANNIGLASS 1200 alleviates restart problems associated with primary lithium oxyhalide cells, especially those containing a lithium-magnesium anode coupled with a thionyl chloride depolarizer having LiAlCl4 as an electrolyte salt dissolved therein. MANNIGLASS 1200 is a non-woven fiberizable glass cloth commonly referred to as E-glass. E-glass consists essentially of: about 52% to about 56% $SiO_2$, about 12% to about 16% $Al_2O_3$, about 0% to about 6% MgO, about 16% to about 25% CaO, about 0% to about 2% $Na_2O+K_2O$, about 5% to about 10% $B_2O_3$, about 0% to about 1.5% $TiO_2$, about 0% to about 1% $F_2$, and about 0.8% FeO, by weight. (See Table 1, page 402 of the Engineering Materials Handbook, Vol. 4, 1991 Edition).

A preferred MANNIGLAS 1200 separator has a basis weight of approximately 1 lb./72 square feet (as per ASTM D-646), a thickness of approximately 0.015" (as per TAPPI T-411), a tensile strength of 15 lbs./inch in the machined direction and 8 lbs./inch in the cross direction (as per ASTM D-858), a tear strength of 155 grams in the machined direction (as per TAPPI T-414), a porosity of 240 cubic feet/minute (as per TAPPI T-251) and an ash content of 95% (as per TAPPI T-413).

After the anode/cathode electrode assembly is positioned inside a conductive casing, a lid is hermetically sealed to the casing such as by welding. The cell is activated by the previously described liquid depolarizer provided in the casing and sealed therein by the provision of a closure welded in a fill opening to hermetically close the cell. Such cells are typically built in a case-negative design with anode electrode in operative contact with the conductive casing and the cathode electrode in electrical contact with a lead, electrically insulated from the casing by a glass-to-metal seal.

The casing lid is preferably of stainless steel, and a suitable glass for the glass-to-metal seal electrically insulating the cathode lead from the casing of the present lithium oxyhalide cell is GBC614U while a suitable terminal lead material is 52 Alloy. Since it is known that 52 Alloy is susceptible to corrosion in certain oxyhalide electrolytes, the 52 Alloy terminal pin is preferably plated with a layer of nickel to improve its corrosion resistance. The layer of nickel is generally 100 microns to 0.002 inches in thickness. Other materials which are suitable for glass seal 72 include CABAL 12 TA-23, FUSITE 425 or FUSITE 435 hermetic sealing glass, and the cell closure is of stainless steel, titanium or nickel, stainless steel being preferred.

The metallic case may comprise materials such as stainless steel, mild steel, nickel, nickel-plated mild steel, titanium, tantalum or aluminum, stainless steel being preferred, but not limited thereto, so long as the metallic material is compatible for use with components of the cell. For a stainless steel lid, the casing is also preferably stainless steel.

Thus, a most preferred chemistry for the oxyhalide cell of the present invention comprises a lithium-magnesium anode alloy supported on a nickel current collector screen. The lithium anode preferably contains about 23% to about 27% magnesium, by weight. The nickel current collector is preferably expanded in both the length-wise and side-wise directions and is annealed in a reducing atmosphere of at least 1,130° F. for a minimum of at least two hours. The cathode electrode preferably comprises acetylene black and/or carbon black mixed with a PTFE binder and supported on a nickel current collector screen. The most preferred screen being an annealed type 200 or 201 series nickel. The anode electrode and the cathode electrode are segregated from each other by a MANNIGLASS 1200 separator. The depolarizer comprises thionyl chloride having an $LiAlCl_4$ electrolyte salt dissolved therein. This oxyhalide chemistry is housed in a conductive casing of stainless steel closed with a stainless steel lid. The cell is provided in a case-negative design with the anode electrically connected to the casing and the cathode electrically connected to a terminal lead. The terminal lead is preferably of 52 Alloy plated with nickel. The terminal lead is insulated from the casing and lid by a glass-to-metal seal having GBC614U glass. Such an electrochemical cell exhibits superior energy density and, just as importantly, superior restart capability in comparison to conventional oxyhalide cells.

The electrochemical cell of the present invention can also be constructed having a case-positive electrical configuration provided by placing the cathode electrode in contact with the conductive cell casing and the anode electrode in electrical contact with the terminal lead. Such a case-positive construction is well known by those skilled in the art.

It is appreciated that various modifications to the inventive concepts described herein may be apparent to those of ordinary skill in the art without departing from the spirit and scope of the present invention as defined by the appended claims.

What is claimed is:

1. An electrochemical cell, which comprises:
    a) an alkali metal anode;
    b) a cathode;
    c) a separator comprising E-glass material disposed between the anode and the cathode;
    d) a catholyte comprising an organic solvent or inorganic depolarizer solvent;
    e) a casing housing the anode and the cathode and serving as a first terminal for one of them; and
    f) a lead serving as a terminal for the other of the anode and the cathode, and the lead being of an alloy consisting essentially of, by weight %, about 50 to 52 nickel, up to about 0.05% carbon, up to about 0.6% manganese, up to about 0.3% silicon, balance iron.

2. The electrochemical cell of claim 1 wherein the alkali metal anode is of a lithium alloy containing about 23% to about 27% magnesium, by weight.

3. The electrochemical cell of claim 1 wherein the anode is of lithium supported on a nickel current collector.

4. The electrochemical cell of claim 3 wherein the nickel current collector is expanded in both a length-wise direction and a side-wise direction before being contacted by the lithium.

5. The electrochemical cell of claim 3 wherein the nickel current collector is annealed in a reducing atmosphere at a temperature of at least 1,130° F. for at least two hours.

6. The electrochemical cell of claim 1 wherein the cathode comprises a carbonaceous material.

7. The electrochemical cell of claim 1 wherein the lead is plated with nickel.

8. The electrochemical cell of claim 1 wherein the E-glass material consists essentially of: about 52% to about 56% $SiO_2$, about 12% to about 16% $Al_2O_3$, up to about 6% MgO, about 16% to about 25% CaO, up to about 2% $Na_2O+K_2O$, about 5% to about 10% $B_2O_3$, up to about 1.5% $TiO_2$, up to about 1% $F_2$ and about 0.8% FeO, by weight.

9. The electrochemical cell of claim 1 wherein the catholyte is provided with a halogen or an interhalogen dissolved therein.

10. The electrochemical cell of claim 9 wherein the halogen is selected from the group consisting of iodine, bromine, chlorine, fluorine, and mixtures thereof.

11. The electrochemical cell of claim 9 wherein the interhalogen is selected from the group consisting of ClF, $ClF_3$, ICL, $ICl_3$, IBr, $IF_3$, $IF_5$, BrCl, BrF, $BrF_3$, $BrF_5$, and mixtures thereof.

12. The electrochemical cell of claim 1 wherein the organic solvent is selected from the group consisting of tetrahydrofuran, propylene carbonate, acetonitrile, dimethyl sulfoxide, dimethyl formamide, dimethyl acetamide, and mixtures thereof.

13. The electrochemical cell of claim 1 wherein the inorganic depolarizer solvent is selected from the group consisting of thionyl chloride, sulfuryl chloride, selenium oxychloride, chromyl chloride, phosphoryl chloride, phosphorous sulfur trichloride, and mixtures thereof.

14. The electrochemical cell of claim 1 wherein the catholyte comprises $LiAlCl_4$ dissolved in thionyl chloride.

15. The electrochemical cell of claim 1 wherein the catholyte includes a salt selected from the group consisting of LiCl, LiBr, LiPF$_6$, LiBF$_4$, LiAsF$_6$, LiSbF$_6$, LiClO$_4$, LiAlCl$_4$, LiGaCl$_4$, LiC(SO$_2$CF$_3$)$_3$, LiN(SO$_2$CF$_3$)$_2$, LiSCN, LiO$_3$SCF$_2$CF$_3$, LiC$_6$F$_5$SO$_3$, LiO$_2$, LiO$_2$CCF$_3$, LiSO$_3$F, LiB(C$_6$H$_5$)$_4$, LiCF$_3$SO$_3$, and mixtures thereof.

16. The electrochemical cell of claim wherein 15 the salt concentration ranges from about 0.1 to 1.8 molar.

17. A method for providing an electrochemical cell, comprising the steps of:
   a) expanding a nickel substrate in both a length-wise direction and a side-wise direction to form a nickel current collector;
   b) annealing the nickel current collector in a reducing atmosphere at a temperature of at least 1,130° F. for at least two hours;
   c) providing an anode of an alkali metal contacted to the annealed nickel current collector;
   d) providing a cathode current collector;
   e) positioning a separator of E-glass material between the anode and the cathode current collector; and
   f) activating the anode and the cathode current collector with a catholyte comprising an organic solvent or inorganic depolarizer solvent.

18. A method for providing an electrochemical cell, comprising the steps of:
   a) expanding a nickel substrate in both a length-wise direction and a side-wise direction to form a nickel current collector;
   b) providing an anode of an alkali metal contacted to the nickel current collector;
   c) providing a cathode current collector in electrical association with the anode;
   d) activating the anode and the cathode current collector with a catholyte comprising an organic solvent or inorganic depolarizer solvent.

19. The method of claim 18 including providing the alkali metal anode of a lithium alloy containing about 23% to about 27% magnesium, by weight.

20. The method of claim 18 including providing the anode of lithium supported on the nickel current collector.

21. The method of claim 18 including positioning a separator of E-glass material between the anode and the cathode current collector.

22. The method of claim 20 including annealing the nickel current collector in a reducing atmosphere at a temperature of at least 1,130° F. for at least two hours before the alkali metal of the anode is contacted thereto.

23. The method of claim 18 including providing the catholyte comprising a halogen or an interhalogen dissolved therein.

24. The method of claim 18 including providing the catholyte comprising LiAlCl$_4$ dissolved in thionyl chloride.

25. The method of claim 18 wherein the E-glass material consists essentially of: about 52% to about 56% SiO$_2$, about 12% to about 16% Al$_2$O$_3$, up to about 6% MgO, about 16% to about 25% CaO, up to about 2% Na$_2$O+K$_2$O, about 5% to 10% B$_2$O$_3$, up to about 1.5% TiO$_2$, up to about 1% F$_2$ and about 0.8% FeO, by weight.

26. A method for providing an electrochemical cell, comprising the steps of:
   a) providing a nickel current collector;
   b) annealing the nickel current collector in a reducing atmosphere at a temperature of at least 1,130° F. for at least two hours;
   c) providing an anode comprising lithium contacted to the annealed nickel current collector;
   d) providing a cathode current collector;
   e) positioning a separator of E-glass material between the anode and the cathode current collector; and
   f) activating the anode and the cathode current collector with a catholyte comprising an organic solvent or inorganic depolarizer solvent.

27. The method of claim 26, including expanding the nickel current collector in both a length-wise direction and a side-wise direction before being contacted by the lithium.

* * * * *